United States Patent [19]

Golay et al.

[11] Patent Number: 4,685,846
[45] Date of Patent: Aug. 11, 1987

[54] CYLINDER TRANSPORTING STABILIZER

[76] Inventors: Kenneth W. Golay, P.O. Box 1562, Duncan, Okla. 73533; Bobby H. Bryan, P.O. Box 423, Ardmore, Okla. 73402

[21] Appl. No.: 836,880

[22] Filed: Mar. 6, 1986

[51] Int. Cl.⁴ ............................................. B60P 7/12
[52] U.S. Cl. ...................................... 410/49; 410/47; 248/172
[58] Field of Search .......................... 188/32; 248/172; 410/30, 36, 42, 47, 49, 50, 97

[56] References Cited

U.S. PATENT DOCUMENTS

| | | | |
|---|---|---|---|
| 2,611,495 | 9/1952 | Weaver | 410/42 |
| 3,026,973 | 3/1962 | Piel | 410/30 X |
| 3,219,152 | 11/1965 | Castellani et al. | 410/30 X |
| 3,338,338 | 8/1967 | Lindeen | 188/32 |
| 3,829,148 | 8/1974 | Stoneburner | 410/49 |
| 4,106,735 | 8/1978 | Partain et al. | 410/49 |
| 4,487,537 | 12/1984 | Morse | 410/47 |

FOREIGN PATENT DOCUMENTS 2216053  7/1973  Fed. Rep. of Germany ........ 410/49

Primary Examiner—Robert B. Reeves
Assistant Examiner—John G. Pido
Attorney, Agent, or Firm—Robert K. Rhea

[57] ABSTRACT

A pair of angle iron chocks are disposed with one flange of each chock in confronting relation with a like flange on the other chock on a common supporting surface and opposing sides of a horizontally disposed cylinder. A length of flexible strapping is threaded at its respective end portions through a plurality of outstanding loops transversely secured to the surfaces of each chock in a manner to maintain the chocks in close proximity with respect to the adjacent arcuate surface of the cylinder.

3 Claims, 2 Drawing Figures

CYLINDER TRANSPORTING STABILIZER

BACKGROUND OF THE INVENTION

1. Field of the Invention

The present invention relates to truck bed transportation of cylinders, such as acetylene and oxygen containers.

It is frequently necessary, as for example in the oil fields, for an acetylene welder to transport his welding equipment by truck from one location to another or to and from a work point in furnishing welding services. The acetylene welding equipment conventionally includes at least one oxygen tank and an acetylene tank. Since these tanks or cylinders are relatively long when compared with their diameter they are generally transported horizontally in a laid-down position on the bed of the truck and since terrain traveled is frequently uneven these cylinders tend to roll by gravity from one portion of the truck bed to another. The rolling cylinders frequently damage other equipment on the truck bed and/or the control valves on the respective cylinder.

This invention provides a quickly and easily adjusted antiroll device which individually engages opposite sides of each cylinder or on opposing sides of the two cylinders when horizontally juxtaposed and prevents any rolling action thereof.

2. Description of the Prior Art

The prior art generally discloses cylinder antiroll chocks of closed loop triangular-shape construction generally rigidly interconnected in aligned spaced-apart relation by a planar web of the same material underlying a specific size cylinder or web coil. While this type of rigid interconnecting web is satisfactory in operation it has the disadvantage of not being easily adjusted for spacing the chocks for antiroll support, of a plurality of different size cylinders as well as being bulky and not easily stored or accessible.

This invention, on the other hand, occupies a relatively small space when not in use, is easily adjusted to accommodate relatively small or large cylinders and is economical in manufacture.

SUMMARY OF THE INVENTION

The invention basically comprises a pair of angle iron chocks disposed transversely of a cylinder and adjustably interconnected by a flexible web extending between the chocks and frictionally engaging the respective chock.

One flange of each chock is horizontally disposed and is arranged in confronting aligned relation with a companion flange of the other chock transversely of a cylinder to be stabilized. The other or upstanding flange of each chock is disposed closely adjacent the periphery of the supporting cylinder. The flexible web transversely underlies the supported cylinder on a common horizontal surface and overlies the confronting horizontal flanges of the chocks. Each chock is provided with a plurality of spaced-apart transverse wire loops through which the respective end portions of the web is entrained in chock overlapping and doubled back upon itself relation for increasing the coefficient of sliding friction between the web and the overlapped surfaces of the flanges of each chock.

Each horizontal chock flange is further provided with a resilient pad increasing the coefficient of sliding friction between the horizontal flanges of the chocks and a common supporting surface.

The principal objects of the invention are to provide an antiroll cylinder stabilizing device for the horizontal transport of cylindrical bodies which is adjustable to fit substantially any size cylinder, is easily stored or removed, occupies a minimum of storage space when not in use and is relatively easily manufactured and economical in cost.

DESCRIPTION OF THE PREFERRED EMBODIMENTS

Figure 1:
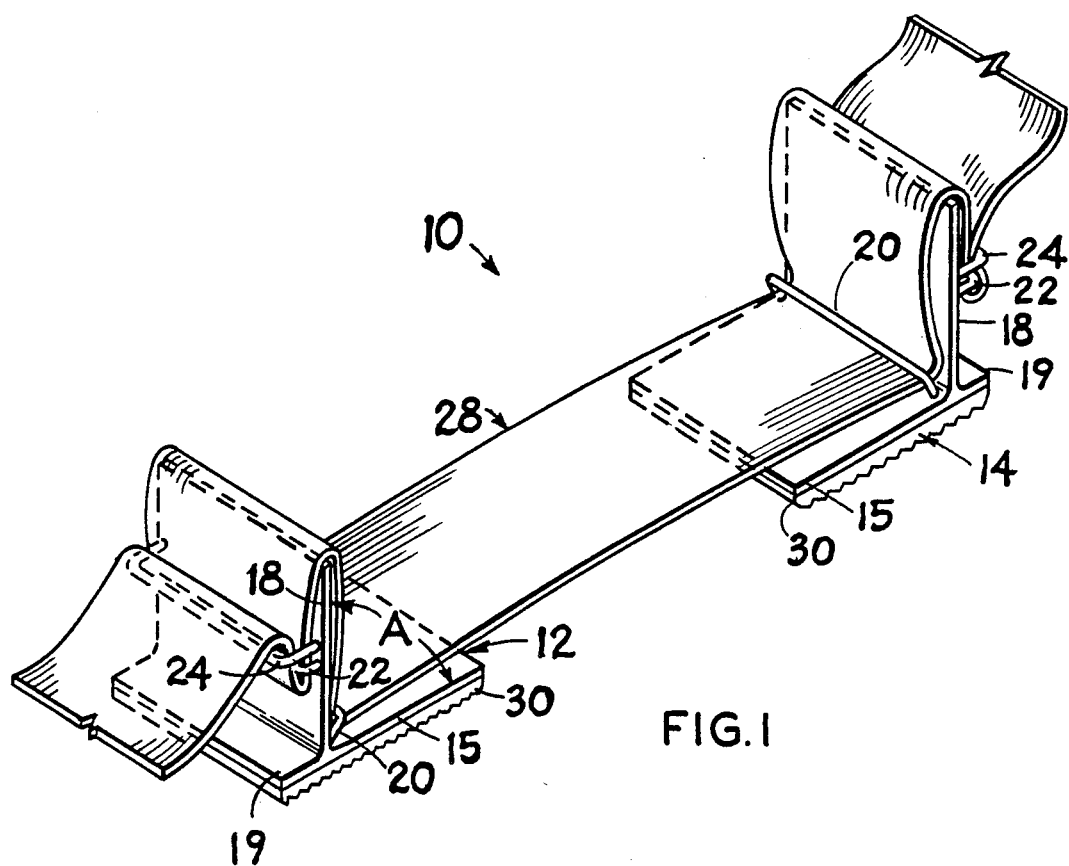
FIG. 1 a perspective view of the stabilizing device, per se.

Like characters of reference designate like parts in those figures of the drawings in which they occur.

In the drawings

The reference numeral 10 indicates the device, as a whole, which is elongated strap-like in general configuration. The device 10 comprises a pair of angle iron chocks 12 and 14 disposed in confronting aligned relation and which are mirror images of each other with only the chock 12 described in detail, in the interest of brevity.

Figure 2:
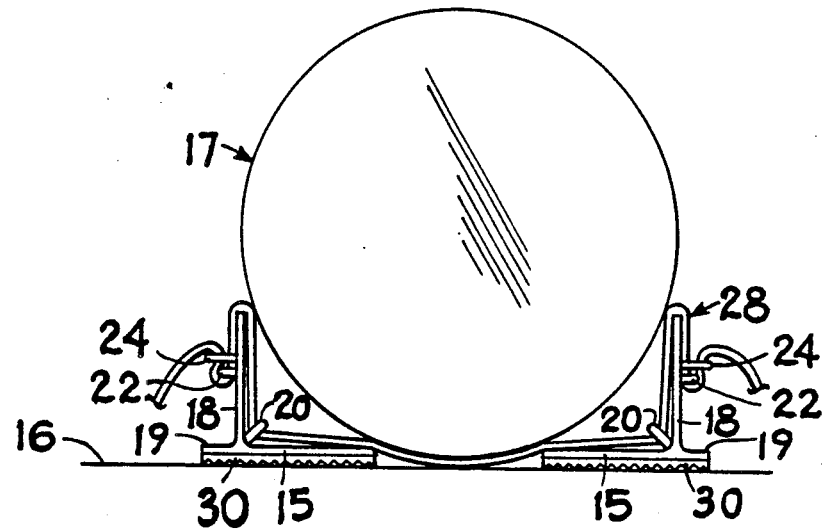
FIG. 2 is an end view of a cylinder supported by the device on a horizontal surface.

The chock 12 is substantially inverted T-shape in side elevation. One end portion of the T-bar forms a base flange 15 of the chock 12 and is substantially of equal length and width and is horizontally disposed on a common supporting surface 16 and projects toward the adjacent surface of a cylinder 17. The stem or other flange 18 of the chock 12 is dimensioned substantially equal with the flange 15 is vertically disposed and defines with the flange 15 a right angle A facing the cylinder. The other portion 19 of the T-bar, projecting horizontally opposite the flange 15 a distance preferably not less than one-fourth or greater than one-half the length of the T-stem, stabilizes the chock 12 against easily tipping to the left, as viewed in FIG. 2.

Three loops 20, 22 and 24, formed from wire or rod material and generally U-shaped, are welded in outstanding relation by their respective legs to the flanges 15 and 18, as shown in the drawings. The rod loop legs are relatively short when compared with the length of the loops for the reasons believed presently apparent.

The loop 20 extends transversely of the chock 12 and substantially bisects the right angle A. The loop 22, substantially identical with the loop 20, is similarly transversely secured horizontally to the surface of the flange 18 substantially medially its height. The loop 24 is provided with legs substantially twice the length of the legs of the loops 20 and 22 and is similarly transversely secured to the flange 18 a selected distance above the loop 22.

The loops 20, 22 and 24 respectively form spaces between the adjacent surface of the flanges and the bight portion of the respective loop to permit threading an elongated section of strap or belting material 28 therethrough.

As shown by FIG. 1, the respective end portion of the material 18 extends longitudinally across the chock flange 15, through the opening formed by the loop 20 and upwardly over the upper limit of the flange 18 where it extends downwardly, adjacent the outer surface of the flange 18, through the opening formed by the loop 22 and is return threaded upwardly, outwardly of the loop 22, through the opening formed by the loop 24. The tortuous path of the respective end portion of the strap or belting 28 thus secures the strap material against longitudinal movement relative to the respective chock and vice versa.

The strap material 28 is preferably formed from rubber or fabric reinforced rubber belting material having ribbing on one surface thereof, not shown, to increase the coefficient of sliding friction when in contact with itself or the chocks.

The depending surface of the base flanges 15 and 19 of the respective chock is preferably bonded to a coextensive layer of resilient material 30 to similarly increase the coefficient of sliding friction between the chocks and a common supporting surface.

In operation, the device 10 is loosely assembled as illustrated by FIG. 1 and described hereinabove and placed on a common supporting surface. The cylinder 17 is then horizontally disposed on the supporting surface between the pair of chocks 12 and 14 in overlying relation with respect to the medial portion of the strap 28. At least one end portion of the strap material 28 is tautly drawn through the loops of one chock to dispose the chocks in confronting cylinder contacting relation.

Obviously the invention is susceptible to changes or alterations without defeating its practicability. Therefore, we do not wish to be confined to the preferred embodiment shown in the drawings and described herein.

We claim:

1. A stabilizing device for horizontally transporting cylinders, or the like, comprising:
    a pair of angle iron chocks disposed in spaced-apart relation adjacent the respective lateral side limit of a cylinder to be stabilized,
    each chock of said pair of chocks being characterized by a pair of substantially equal width and length flanges disposed in right angular relation,
    one flange of said pair of flanges of each chock being horizontally disposed and in confronting relation with the companion flange on the opposite chock;
    a length of belting material extending between said pair of chocks beneath the cylinder for preventing separating movement of the chocks relative to each other or the cylinder; and,
    loop means on said chocks transversely spanning the belting material for inducing friction gripping contact between the chocks and the representive end portions of said belting material,
    said loop means comprising a plurality of U-shaped rod-like loops each connected at their respective ends with opposite marginal edge portions of the respective chock of said pair of chocks,
    at least one said loop substantially bisecting the right angle,
    at least two said loops disposed in vertically spaced relation adjacent the upper limit of the chock upright flange.

2. The stabilization device according to claim 1 in which the flanges of each chock of said pair of chocks form an inverted T-shaped in end elevation with one end portion of the horizontal flange forming the bar of the T-shape being equal with the flange defining the length of the stem of the T-shape and the opposite end portion of the horizontal flange forming the bar of the T-shape being not greater than one half the flange dimension defining the length of the stem of the T-shape.

3. The stabilization device according to claim 2 and further including:
    a layer of resilient material padding underlying and bonded to each chock of said pair of chocks.

* * * * *